UNITED STATES PATENT OFFICE.

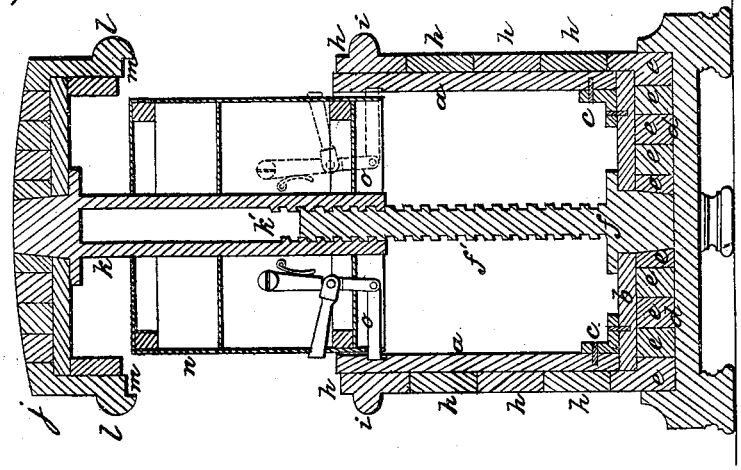
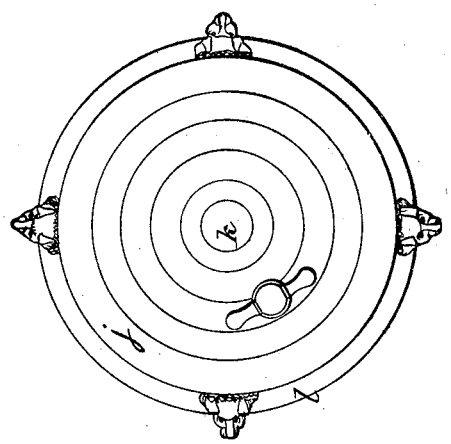
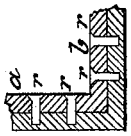
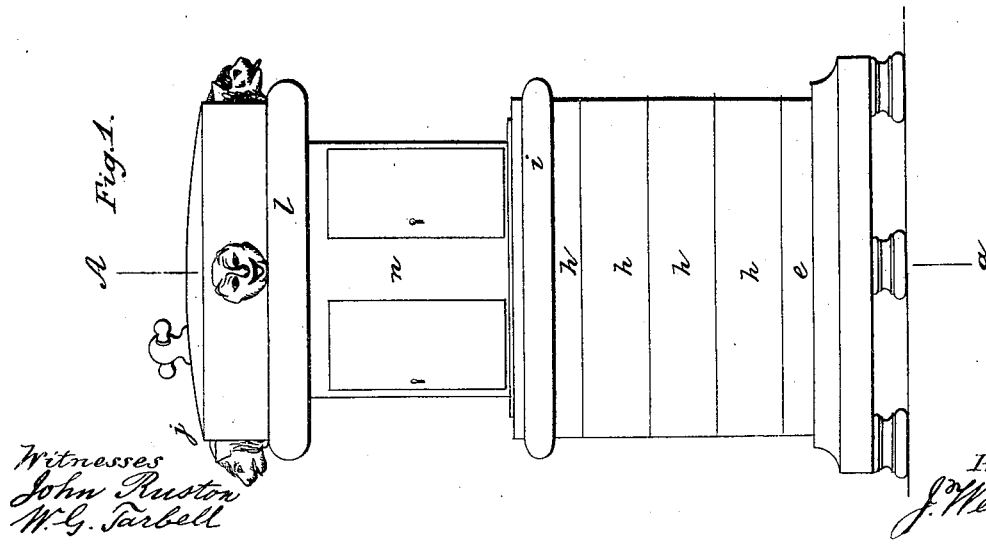

J. WEIMAR, OF NEW YORK, N. Y.

IMPROVEMENT IN THE CONSTRUCTION OF BURGLAR-PROOF SAFES.

Specification forming part of Letters Patent No. 88,928, dated April 13, 1869.

*To all whom it may concern:*

Be it known that I, J. WEIMAR, of the city, county, and State of New York, have invented a new and useful Improvement in Burglar-Proof Safes; and I do hereby declare that the following is a full, clear, and exact description thereof, reference being had to the accompanying drawings, making part of this specification, in which—

Figure 1 is an elevation of the safe opened; Fig. 2, a top view, and Fig. 3 a vertical section taken in the plane of the line A *a*.

The same letters indicate like parts in all the figures.

In the accompanying drawings, *a* represents an inner cylinder, made of boiler-iron, with a bottom, *b*, of like material, secured by angle-iron *c* and rivets. Below this I prefer to have a burglar-proof bottom, *d*, composed of a series of rings, *e*, shrunk onto each other. I prefer to make each of these rings of alternate layers of steel and wrought-iron, properly welded, in manner well known in the arts.

The several rings are made successively of larger diameter. The first or inner one is shrunk onto the lower conical end of a standard, *f*, to be presently described; the second is shrunk onto the cylindrical circumference of the first, and so on to the outer one, which I prefer to make of greater thickness than the others, so as to lap over the lower end of the inner cylinder, *a*. The rings should be properly turned and fitted, so that when shrunk on each will gripe the ring inside of it with great force. The outer bottom, so made, is then heated and plunged in a suitable liquid, to harden the steel to prevent drilling. This burglar-proof bottom may be further secured to the inner bottom, *b*, by conical drill-proof bolts; but the holes for these bolts should be made before hardening.

A series of rings, *h*, of the same size as the outer one of the bottom *d*, and made and hardened in like manner, is shrunk onto the cylinder *a*, and the upper one of the series is formed with a semicircular molding, *i*, on the outside, and within a short distance of the upper edge, for a purpose to be presently described.

The cover *j* is formed like the outer bottom, *d*, of a series of like rings, shrunk one upon another, the inner one of the series being shrunk upon the conically-formed head of a central rod, *k*. The conical part of this rod is made, like the rings, of alternate laminæ of wrought-iron and steel, welded, so that when the steel is hardened it will prevent drilling.

The outer ring of this cover is made of greater depth than the others, and with a semicircular molding, *l*, similar to the molding on the upper one of the series of rings *h*, but having an inner rabbet, *m*, to fit onto and over that portion of the upper ring, *h*, which projects above the molding *i*, so that when the cover is shut down and locked it cannot be forced open by driving wedges between the two moldings *i* and *l*, as the wedges will be stopped, coming into contact with that portion of the upper ring, *h*, above the molding *i*.

The standard *f*, above the bottom *b*, is threaded, as represented at *f'*, and the lower portion of the rod *k*, below the cover, is hollow and threaded, as at *k'*, to fit the thread on the standard *f*, so that by turning the cover can be elevated or depressed at will.

A case, *n*, suitable for containing valuables, and provided with doors, shelves, &c., is secured to the rod *k*, so as to move up and down with it. This case extends from the lower end of the threaded part *k'* of the rod to the cover, and is of a diameter which will readily move up and down inside of the cylinder *a*. By turning the cover in one direction the doors of the case are elevated above the upper edge of the cylinder *a*, and by turning in the opposite direction the case is carried down into this cylinder, and the cover locked by any suitable lock. For the purpose of holding up the case when elevated there are one or more catch-levers, *o*, hinged to the inside of the case. For greater safety, after making the wrought-iron cylinder *a*, with its bottom *b*, holes are punched, and projecting rivets *r* (see Fig. 4) driven in, so as to project from the outer surface, and onto this a thickness of Franklinite iron is cast preparatory to putting on the series of rings; and although I deem a safe so constructed more safe than if made without the lamina of Franklinite, yet considerable safety can be obtained without it; and although I prefer to make the rings drill-proof, by making each of alternate laminæ of iron and steel, I do not wish to be understood as limiting my claim of invention thereto, as they may be made drill-proof in other ways.

What I claim as my invention, and desire to secure by Letters Patent, is—

1. Making the body of the case of a series of drill-proof rings shrunk into an inner cylinder, substantially as and for the purpose specified.

2. Also, the cover composed of a series of drill-proof rings shrunk upon one another, substantially as and for the purpose specified.

3. Also, the combination of the cover, constructed as described, with the body, constructed as described, when the outer ring of the cover and the upper ring of the body of the safe are both formed substantially as described, to prevent wedging.

4. Also, in combination, the inner case, the body of the safe, the cover, and the center screw and its socket, substantially as and for the purpose described.

J. WEIMAR.

Witnesses:
  JOHN RUSTON,
  W. G. TARBEL.